United States Patent [19]

King

[11] Patent Number: 4,798,191

[45] Date of Patent: Jan. 17, 1989

[54] METHOD AND APPARATUS FOR HANDLING FUEL

[75] Inventor: Harvey M. King, Taylors, S.C.

[73] Assignee: Robert A. Brown, Jr., Greenville, S.C.

[21] Appl. No.: 144,879

[22] Filed: Jan. 15, 1988

[51] Int. Cl.[4] .................. F02M 31/00; F02M 31/10
[52] U.S. Cl. .................................. 123/557; 123/538
[58] Field of Search ............... 123/549, 546, 557, 538, 123/536

[56] References Cited

U.S. PATENT DOCUMENTS

| | | | |
|---|---|---|---|
| 1,043,580 | 11/1912 | Eldred | 123/536 |
| 1,212,595 | 1/1917 | Williams | 236/18 |
| 1,447,640 | 3/1923 | Bernett | 123/557 |
| 1,472,264 | 10/1923 | Beck | 123/557 |
| 2,205,388 | 6/1940 | Boatright et al. | 261/41.5 |
| 2,231,605 | 2/1941 | Stephenson et al. | 123/3 |
| 2,632,296 | 3/1953 | Houdry | 123/536 |
| 3,110,296 | 11/1963 | Lundi | 123/557 |
| 3,989,019 | 11/1976 | Brandt et al. | 123/557 |
| 4,083,340 | 4/1978 | Furr et al. | 123/557 |
| 4,157,700 | 6/1979 | Conner | 123/557 |
| 4,286,551 | 9/1981 | Blitz | 123/557 |
| 4,338,891 | 7/1982 | Blitz | 123/557 |
| 4,395,996 | 8/1983 | Davis | 123/557 |

Primary Examiner—Willis R. Wolfe
Assistant Examiner—M. Macy
Attorney, Agent, or Firm—Dority & Manning

[57] ABSTRACT

A fuel conditioning apparatus is disclosed for conditioning liquid fuel prior to combustion of the liquid fuel in an internal combustion engine. The fuel conditioning apparatus includes a flow passage for carrying the liquid fuel and a heating device disposed within the flow passage for heating the liquid fuel to a point below the vaporization point thereof. Also disposed within the flow passage is a polytetrafluoroethylene material for contacting the heated liquid fuel within the flow passage. The contact of the heated liquid fuel with the polytetrafluoroethylene material causes improved combustibility in the liquid fuel when the fuel is subsequently burned in the engine, thereby allowing for an increase in the fuel efficiency of the engine.

18 Claims, 2 Drawing Sheets

METHOD AND APPARATUS FOR HANDLING FUEL

BACKGROUND OF THE INVENTION

The present invention relates to a method and an apparatus for conditioning liquid fuel prior to the combustion thereof in an internal combustion engine.

In a conventional internal combustion engine, air and vaporized liquid fuel are mixed together in a predetermined ratio. This mixture is then delivered to the combustion chamber or chambers of the engine. Typically, the liquid fuel is vaporized by a carburetor or some type of fuel injection means. The liquid fuel is generally delivered to the carburetor or fuel injection means by means of a fuel pump.

In providing an engine which operates at optimum efficiency, it is necessary that the fuel experiences complete combustion in the combustion chambers of the engine. Hence, by improving the combustion of the fuel in the combustion chambers of the engine, the efficiency of the engine will likewise be improved. The consequence of incomplete combustion of the fuel correspondingly lowers the efficiency of the engine and also increases the amount of pollutants exhausted therefrom. In an effort to alleviate the problems of incomplete combustion, additives have been provided in fuel for increasing the combustibility of the fuel. However, such additives may cause the production of other pollutants which are harmful to the public.

Devices have been patented for attempting to increase the efficiency of an engine through improving the combustion of fuel therein. One such patent, U.S. Pat. No. 4,157,700 granted to Conner, entitled, "Pre-Vaporization System", discloses a system which includes microwave generation means for pre-vaporizing fuel for an internal combustion engine. U.S. Pat. No. 3,989,019, granted to Brandt et al., entitled, "Fuel Heating Apparatus", discloses a fuel heating apparatus which includes a heating coil for heating fuel prior to its combustion in an engine. Other patented devices for heating fuel prior to the combustion thereof are disclosed in the following U.S. Pat. Nos.: 3,110,296, granted to Lundi; 2,205,388, granted to Boatright et al.; 1,472,264, granted to Beck; 1,447,640, granted to Bernett; and 1,212,595, granted to Williams.

U.S. Pat. No. 2,231,605, granted to Stephenson et al., entitled, "Fuel Conditioning", discloses a device having copper screens and nickel screens which serve the functions of pro-oxidants and catalysts. Gas flows through the screens prior to the combustion thereof.

SUMMARY OF THE INVENTION

It is therefore an object of the present invention to provide a method and an apparatus for improving the combustibility of a liquid fuel prior to the combustion thereof in an engine.

Another object of the present invention is to provide an apparatus for improving the combustibility of fuel, wherein the apparatus may be provided in a wide variety of applications.

Another object of the present invention is to provide an apparatus for conditioning fuel which can be easily installed in an automobile, truck, tractor, boat, or other applications using internal combustion engines.

Another object of the present invention is to provide an apparatus for improving the combustibility of fuel which is of relatively simple and durable construction.

Various combinations of presently disclosed features may be provided in a given embodiment thereof in accordance with this invention. Generally, one such exemplary embodiment of the present invention includes an apparatus for improving the combustibility of a liquid fuel prior to the combustion thereof in an engine. The apparatus is supplied the liquid fuel from a fuel supply source and comprises flow passage means for receiving the liquid fuel. The flow passage means defines both a flow passage therethrough for carrying the liquid fuel and a fuel inlet in fluid communication with the flow passage. The fuel inlet is adapted for receiving liquid fuel from the fuel source. A polytetrafluoroethylene material is disposed within the flow passage means for contacting the liquid fuel prior to the liquid fuel being supplied to the engine for combustion. The flow passage means also defines a fuel outlet in fluid communication with the flow passage, the fuel outlet being adapted for supplying the liquid fuel from the flow passage means after the liquid fuel has contacted the polytetrafluoroethylene material. The fuel outlet supplies the liquid fuel for subsequent combustion in the engine.

More specifically, the apparatus further comprises heating means associated with the flow passage means for heating the liquid fuel to a point below which causes the liquid fuel to vaporize, while the liquid fuel is contacting the polytetrafluoroethylene material in the flow passage means. Naturally, the vaporization of the liquid fuel depends, among other things, on the the flow passage means.

The present invention also includes a method of improving the combustibility of a liquid fuel prior to the combustion thereof in an internal combustion engine. The method comprises providing liquid fuel from a fuel supply source and supplying the liquid fuel to the flow passage means. The method also includes exposing the liquid fuel within the flow passage means such that it contacts a polytetrafluoroethylene material disposed within the flow passage means and supplying the liquid fuel after contact with the polytetrafluoroethylene material to the engine for subsequent combustion therein. Further, the method of the present invention includes heating the liquid fuel to a point below which causes the liquid fuel to vaporize, as the liquid fuel contacts the polytetrafluoroethylene material in the flow passage means.

BRIEF DESCRIPTION OF THE DRAWINGS

The foregoing as well as other objects of the present invention will be more apparent from the following detailed description of a preferred embodiment of the invention, including the best mode thereof, when taken together with the accompanying drawings, in which.

DESCRIPTION OF THE PREFERRED EMBODIMENT

Figure 1:
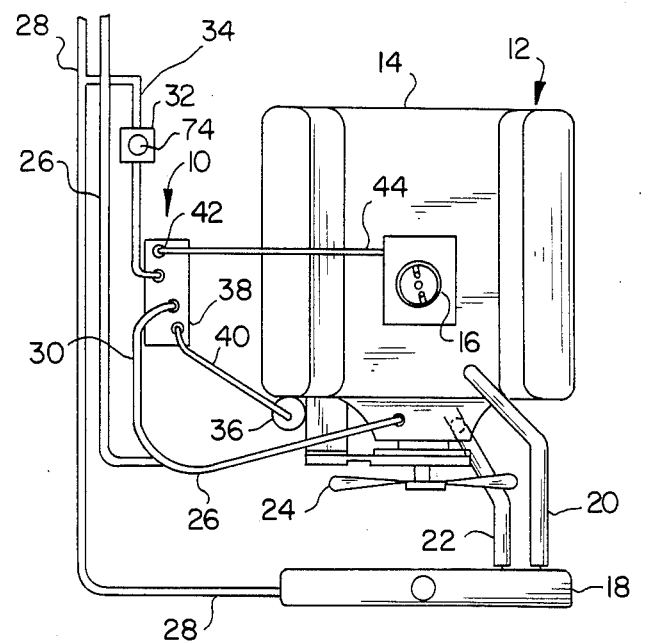
FIG. 1 is a plan view of a fuel conditioning apparatus constructed in accordance with the present invention, the fuel conditioning apparatus being installed on a conventional internal combustion engine.

Referring to the drawings in detail, wherein like reference characters represent like elements throughout the various views, a fuel conditioning apparatus constructed in accordance with the present invention is shown in FIG. 1 and is designated generally by the reference character 10. Fuel conditioning apparatus 10 is illustrated in FIG. 1 as being connected to a conventional internal combustion engine, generally 12. Engine 12 includes engine block 14, on which a carburetor 16 is mounted for communication with combustion chambers (not shown) within engine block 14. Also provided with engine 12 is a radiator 18 for cooling engine coolant which circulates between radiator 18 and engine 12 via upper radiator hose 20 and lower radiator hose 22. A fan 24 is provided with engine 12 for cooling radiator 18, thereby cooling the coolant fluid flowing therethrough.

Connected to engine 12 is a hose 26 which provides heated coolant fluid to the heating system (not shown) of a conventional automobile, truck, or the like, in which engine 12 is installed. A return hose 28 is provided for returning the fluid from the heating system to radiator 18. A supply hose 30 is connected to hose 26 for providing heated engine coolant to fuel conditioner 10 through a control valve 32. Extending from fuel conditioner 10 is a coolant return hose 34 which extends into the heating system and which may also be connected to hose 26.

A fuel pump 36 delivers fuel to an inlet 38 of fuel conditioner 10 via a fuel line 40. Extending from an outlet 42 of fuel conditioner 10 is a carburetor supply line 44 which delivers fuel from fuel conditioner 10 to carburetor 16.

Figure 2:
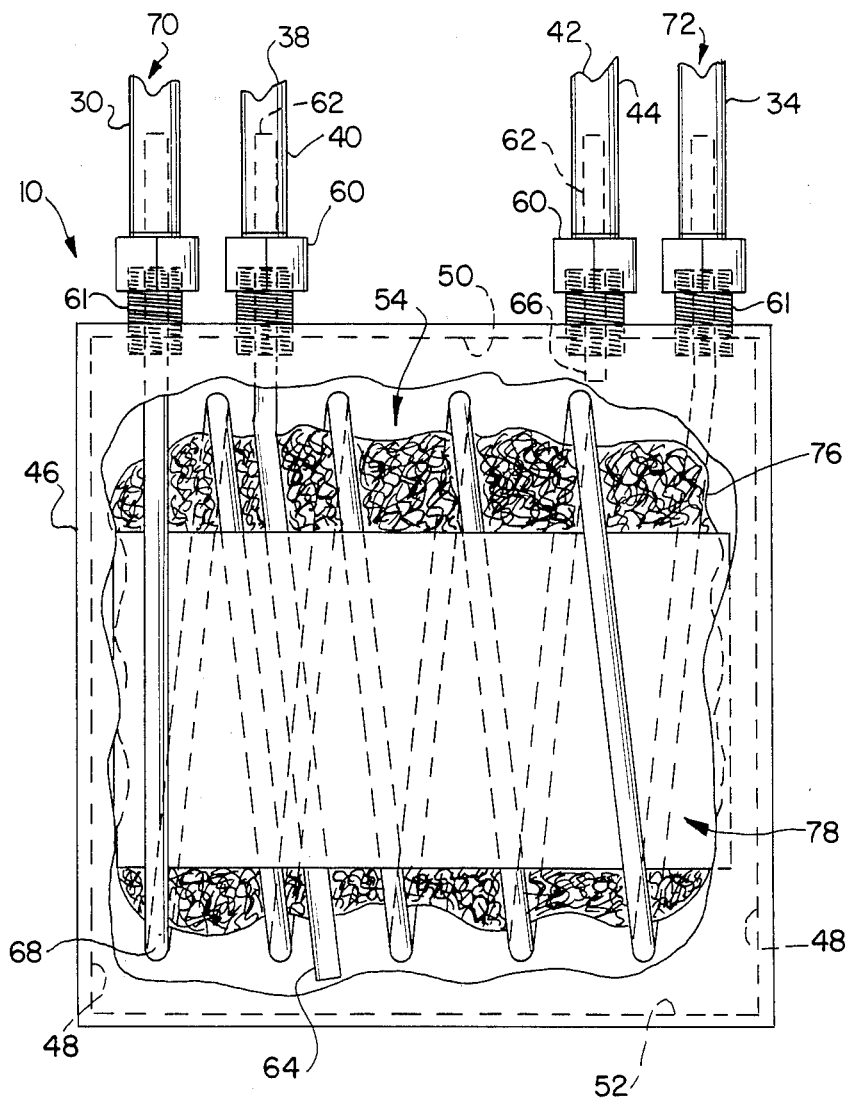
FIG. 2 is a side elevational view, with parts cut away, illustrating a fuel conditioning apparatus constructed in accordance with the present invention.

Turning to FIG. 2 of the drawings, a detailed description of fuel conditioner 10 will be given. Fuel conditioner 10 includes flow passage means which could be a receptacle or container 46. Container 46 could be of a variety of shapes and sizes, but in one exemplary embodiment includes a container 46 of generally rectangular construction having side walls 48, a top wall 50, and a bottom wall 52. Container 46 may be constructed of steel, with side walls 48, top wall 50, and bottom wall 52 being welded together or connected together by any other suitable means. It is to be understood that container 46 does not have to be made of steel, but could be constructed of any other suitable material.

Container 46 defines a flow passage or chamber, generally 54, therein. In fluid communication with chamber 54 is fuel inlet 38 and fuel outlet 42. Fuel inlet and outlet 38, 42 each include standard threaded connectors 60 having threaded portions 61 extending downwardly therefrom and nipple portions 62 extending upwardly therefrom. Extending downwardly from fuel inlet 38 is a tube 64 which terminates near bottom wall 52 of container 46. A shorter tube 66 extends downwardly into chamber 54 of container 46 and is connected to fuel outlet 42.

Means for heating fuel within chamber 54 are provided within chamber 54 and include coiled tubing 68 connected between a coolant fluid inlet, generally 70, and a coolant fluid outlet, generally 72, which are provided in container 46. Coolant fluid inlet and outlet 70, 72 may also include threaded connectors 60 and nipple portions 62, as discussed above.

Engine coolant, which is heated in engine block 14 by heat derived from the combustion of fuel within engine 12, is supplied from the coolant system of engine 12 to coolant fluid inlet 70 by means of coolant supply hose 30. The flow rate of coolant fluid through coolant supply hose 30, and thus through coiled tubing 68, is controlled by the conventional control valve 32 which allows for the flow rate of coolant fluid therethrough to be readily varied with a valve member adjustor such as a knob 74 provided on control valve 32.

Disposed within chamber 54 are heat transfer means for transferring heat from coiled tubing 68, which is heated by the coolant fluid from the coolant system of engine 12, to liquid fuel in chamber 54, which is supplied by fuel pump 36 to fuel inlet 38. The heat transfer means are illustrated in FIG. 2 as being metal portions 76 such as brass wool, copper wool, stainless steel wool, or the like. It is to be understood that the heat transfer means of the present invention are not to be limited to such metal wool. Many other materials or means exist for transferring heat to the liquid fuel in chamber 54. For example, crushed glass, metal shavings, or a variety of other suitable materials could be provided in chamber 54 for transferring heat to the liquid fuel. Also, a conventional finned heat exchanger, such a small radiator or heater core, could be provided in chamber 54 for transferring heat to the liquid fuel therein.

An important feature of the present invention is that polytetrafluoroethylene material, commonly known as Teflon (a registered trademark for synthetic resin polymers and products), is provided in chamber 54 for contact with the liquid fuel as the liquid fuel passes through chamber 54 prior to entering gas vaporization means such as fuel injectors (not shown) or carburetor 16. The polytetrafluoroethylene material is indicated generally in FIG. 2 by reference numeral 78 and may include a sheet, block, or polytetrafluoroethylene coated member. It is to be understood that the polytetrafluoroethylene material in chamber 54 could be provided in a variety of forms within container 46 and is not limited to the polytetrafluoroethylene member 78 indicated in FIG. 2. For example, the interior wall surfaces of chamber 54 could be coated with a polytetrafluoroethylene material for allowing contact of the liquid fuel therewith while the liquid fuel is within chamber 54. Or, coiled tubing 68 could be coated with the polytetrafluoroethylene material for being exposed to the liquid fuel in chamber 54. Further, instead of container 46 having chamber 54 with a polytetrafluoroethylene material provided therein, a simple conduit could be provided having an inner flow passage with polytetrafluoroethylene coated surfaces for contacting liquid fuel as the liquid fuel passes through the conduit. The liquid fuel could be heated prior to entering the conduit, or the outer wall of the conduit could be subjected to heat such that liquid fuel flowing therethrough would also be heated as it contacts the polytetrafluoroethylene surfaces within the conduit. Although these suggested alternate forms of the present invention are not illustrated, they are encompassed by the scope of the present invention, as are a variety of other embodiments which are possible for exposing heated liquid fuel to a polytetrafluroethylene material prior to the liquid fuel being delivered to an engine or other combustion device for combustion therein.

While the actual chemical and physical phenomenon which occur when the heated liquid fuel, which is heated below its vaporization point, contacts polytetrafluoroethylene material is not fully understood, the results are evidenced in increased efficiency of an engine supplied with such heated fuel, which has been exposed to polytetrafluoroethylene material prior to combustion therein. The increased efficiency of the engine allows for lower fuel consumption of the engine, which results in automobiles, for example, being able to travel more miles per gallon of gasoline, or diesel fuel. Also, because of the increased efficiency of the engine, the power output of the engine is likewise increased when supplied such heated fuel which has contacted the polytetrafluoroethylene material.

It is believed that the heating of the liquid fuel within chamber 54 causes the liquid fuel to expand somewhat as it is exposed to the polytetrafluoroethylene material. It is to be understood, however, that for optimum results, the liquid fuel is not to be heated to its vaporization point, but is to be heated to a point below which causes vaporization thereof. It is also believed that the combination of heating the liquid fuel to a point below its vaporization point and exposing it to the polytetrafluoroethylene material causes the liquid fuel to have a higher explosive temperature in the cylinders or combustion chambers of the engine, for thereby providing an explosion of greater temperature within the combustion chambers to allow for a more complete and efficient burning of the fuel therein.

As discussed above, there are a wide variety of means by which polytetrafluoroethylene material can be provided in chamber 54. As also discussed above, the interior surfaces of side walls 48, top wall 50, and bottom wall 52 can all be coated with the polytetrafluroethylene material in a conventional surface coating process, wherein the polytetrafluoroethylene material is deposited in a layer on the surfaces. With regards to the provision of polytetrafluoroethylene material to coil tubing 68, as discussed above, the polytetrafluoroethylene material could be shrink-fitted to the surfaces of coiled tubing 68 to allow exposure of the polytetrafluoroethylene material to the liquid fuel in chamber 54.

While container 46 is illustrated as being generally rectangularly shaped, container 46 could also be cylindrically shaped, spherically shaped, or irregularly shaped in any of a variety of suitable configurations. The particular size of container 46 and the corresponding volume of its chamber 54 can be sized for the particular engine or application for which fuel conditioner 10 is to be provided. The volume of chamber 54 necessary to provide optimum results would depend on, among other things, the flow rate of liquid fuel therethrough, the temperature of the heating means provided for chamber 54, the amount of heat transfer from the heating means to the liquid fuel, and the surface area of polytetrafluoroethylene material to which the liquid fuel is exposed.

For example, a fuel conditioner 10 for a conventional V-8 engine, such as a Chevrolet engine with a 350 cubic inch displacement, can be approximately 6 to 7 inches from bottom wall 52 to top wall 50, approximately 6 inches wide, and with sides approximately 3 inches deep. Side walls 48 can be constructed of 3/16 inch thick steel channel having a seamless weld. Top and bottom walls 50, 52 can be constructed of ⅜ inch steel welded to side walls 48. Coiled tubing 68 can be ⅜ inch (outside diameter) copper tubing, as can also be tubes 64, 66. Metal wool 76 can also be copper. Polytetrafluoroethylene member 78 can be a thin polytetrafluoroethylene sheet which is provided around metal wool 76 and coiled tubing 68.

It is to be understood that fuel conditioner 10 can be used for a variety of different internal combustion engines including diesel engines, wherein it would be installed between the primary and direct drive fuel supply means for the engine. Fuel conditioner 10 may also find use in many applications where liquid fuel is burned, especially where compression of the fuel is involved during ignition thereof.

Although the heating means for fuel conditioner 10 has been illustrated as using coiled tubing 68 for carrying heated coolant fluid from the cooling system of engine 12 through chamber 54 for exchanging heat therefrom to the liquid fuel in chamber 54, it is to be understood that a wide variety of other heating means could be used to heat the fuel. Heat derived from the combustion in engine 12 such as from the exhaust of engine 12 could also be used to heat the liquid fuel. Further, an electric heater could be disposed in chamber 54 for heating the liquid fuel therein, or heating means could be provided for heating the liquid fuel prior to its entrance into chamber 54. Also, while use of polytetrafluoroethylene material of the composition commonly known as Teflon is presently preferred for being exposed to the liquid fuel, the present invention is not to be limited to such composition because other compositions in the family of polytetrafluoroethylene materials may also be used to yield desirable results.

While the preferred embodiment of the invention has been described using specific terms, such description is for present illustrative purposes only, and it is to be understood that changes and variations to such embodiment, including but not limited to the substitution of equivalent features or parts, and the reversal of various features thereof, may be practiced by those of ordinary skill in the art without departing from the spirit or scope of the following claims.

What is claimed is:

1. An apparatus for improving the combustibility of a liquid fuel prior to combustion thereof in an engine, the apparatus being supplied the liquid fuel from a fuel supply source, the apparatus comprising:

flow passage means for receiving the liquid fuel; said flow passage means defining a flow passage therethrough for carrying the liquid fuel and a fuel inlet in fluid communication with said flow passage, said fuel inlet being adapted for receiving liquid fuel from the fuel supply source;

a polytetrafluoroethylene material disposed within said flow passage means for contact with the liquid fuel prior to the liquid fuel being supplied to the engine for combustion;

heating means associated with said flow passage means for heating the liquid fuel to a point below which causes the liquid fuel to vaporize; and said flow passage means defining a fuel outlet in fluid communication with said flow passage, said fuel outlet being adapted for supplying the liquid fuel from said flow passage means after the liquid fuel has been exposed to said polytetrafluoroethylene material, said fuel outlet supplying the liquid fuel for subsequent combustion in the engine.

2. An apparatus as defined in claim 1, wherein said heating means heats the liquid fuel while the liquid fuel is contactable with said polytetrafluoroethylene material in said flow passage means.

3. An apparatus as defined in claim 1, wherein said heating means heats the liquid fuel prior to the liquid fuel being contactable with said polytetrafluoroethylene material in said flow passage means.

4. An apparatus as defined in claim 2, wherein said heating means includes a heat exchanger in said flow passage means for heating the liquid fuel while the liquid fuel is contactable with said polytetrafluoroethylene material.

5. An apparatus as defined in claim 2, wherein said heating means includes a heat exchanger in said flow passage means for heating the liquid fuel while the liquid fuel is contactable with said polytetrafluoroethylene material; said heat exchanger including a conduit adapted for carrying heated coolant fluid from the engine, whereby heat from the heated coolant fluid is transferred by said heat exchanger to the liquid fuel in said flow passage means.

6. An apparatus as defined in claim 5, wherein said conduit includes coiled tubing.

7. An apparatus as defined in claim 1, wherein said flow passage means is a generally rectangular container having a top wall, side walls, and a bottom wall; and wherein said fuel inlet includes an inlet tube extending downwardly through said top wall which terminates near said bottom wall for delivering fuel within said container.

8. An apparatus as defined in claim 1, wherein said polytetrafluoroethylene material includes a (polytetrafluoroethylene sheet disposed in said flow passage means.

9. An apparatus as defined in claim 1, wherein said polytetrafluoroethylene material includes a polytetrafluoroethylene block disposed in said flow passage means.

10. An apparatus as defined in claim 1, wherein said polytetrafluoroethylene material includes a member having a polytetrafluoroethylene surface coating for exposure to the liquid fuel.

11. An apparatus as defined in claim 2, further comprising heat transfer means associated with said heating means for transferring heat from said heating means to the liquid fuel in said flow passage means.

12. An apparatus as defined in claim 11, wherein both said heating means and said heat transfer means are disposed in said flow passage means; and wherein said heat transfer means includes metal portions contactable with said heating means and the liquid fuel for aiding in transferring heat from said heating means to the liquid fuel while the liquid fuel is being exposed to said polytetrafluoroethylene material.

13. An apparatus for improving the combustibility of a liquid fuel prior to combustion thereof in an internal combustion engine having a liquid cooling system, the apparatus being supplied fuel from a conventional fuel supply, the apparatus comprising:
  a receptacle for receiving the liquid fuel; said receptacle defining a fuel inlet adapted for receiving liquid fuel from the fuel supply;
  a polytetrafluoroethylene material disposed within said receptacle contactable with the liquid fuel prior to the liquid fuel being supplied to the internal combustion engine for combustion therein;
  heating means associated with said receptacle for heating the liquid fuel while the liquid fuel is contactable with said polytetrafluoroethylene material in said receptacle; said heating means including a heat exchanger in said receptacle; said heat exchanger defining a conduit adapted for carrying heated coolant fluid from the cooling system of the engine, whereby heat from the heated coolant fluid is transferred by said heat exchanger to the liquid fuel in said receptacle; and
  said receptacle defining a fuel outlet adapted for supplying the liquid fuel from said receptacle after the liquid fuel has been exposed to said polytetrafluoroethylene material for subsequent combustion in the engine.

14. An apparatus as defined in claim 13, further comprising a control valve associated with said conduit for allowing the flow of the heated coolant fluid through said conduit to be selectively varied.

15. An apparatus as defined in claim 13, wherein said polytetrafluoroethylene material includes a polytetrafluoroethylene sheet disposed in said receptacle.

16. An apparatus as defined in claim 13, further comprising heat transfer means associated with said heat exchanger for transferring heat from said heat exchanger to the liquid fuel in said receptacle.

17. A method for improving the combustibility of a liquid fuel prior to combustion thereof in an internal combustion engine, the method comprising:
  providing liquid fuel from a fuel supply source and supplying said liquid fuel to within flow passage means;
  heating said liquid fuel to a point below which causes said liquid fuel to vaporize;
  directing said heated liquid fuel within said flow passage means for contact with a polytetrafluoroethylene material disposed within said flow passage means; and
  supplying said liquid fuel after contact with said polytetrafluoroethylene material to said engine for subsequent combustion therein.

18. A method as defined in claim 17, further comprising:
  heating said liquid fuel as said liquid fuel contacts said polytetrafluoroethylene material with heat derived from the combustion in said engine.

* * * * *